United States Patent [19]

Fenstermacher et al.

[11] Patent Number: 5,497,062
[45] Date of Patent: Mar. 5, 1996

[54] DIGITAL PULSE-WIDTH MODULATED SYSTEM FOR PROVIDING CURRENT TO A LOAD

[75] Inventors: Brian J. Fenstermacher, Telford; James P. Detweiler, Lansdale, both of Pa.

[73] Assignee: Performance Controls, Inc., Horsham, Pa.

[21] Appl. No.: 123,677

[22] Filed: Sep. 20, 1993

[51] Int. Cl.$^6$ ............................................. H02P 5/40
[52] U.S. Cl. .......................... 318/599; 318/811; 388/901
[58] Field of Search .................... 318/599–604, 318/799, 811; 388/901; 375/22; 363/41

[56] References Cited

U.S. PATENT DOCUMENTS

| | | | |
|---|---|---|---|
| 4,467,262 | 8/1984 | Curtiss | 318/811 |
| 4,749,927 | 6/1988 | Rodal et al. | 318/599 |
| 5,023,535 | 6/1991 | Miller et al. | 318/599 |
| 5,070,292 | 12/1991 | Goff | 318/811 |
| 5,081,409 | 1/1992 | Goff | 318/811 |

*Primary Examiner*—Briar Sircus
*Attorney, Agent, or Firm*—William H. Eilberg

[57] ABSTRACT

A digital process generates a pulse-width modulated (PWM) signal for providing current to a load. In one embodiment, an input signal is repeatedly sampled at times corresponding to edges of a reference square wave. The sampled values are used to produce a PWM signal, each pulse of the PWM signal having a width corresponding to one of the sampled values. In another embodiment, the sampled values are used to produce a series of intermediate pulses, the intermediate pulses being used to construct an output PWM signal. The pulses of the output PWM signal generally have leading and trailing edges which do not coincide with the times at which sampling occurs. Therefore, in the second embodiment, sampling does not occur when the PWM signal is opening or closing a switch, and the sampling tends to occur near the average value of the input signal.

7 Claims, 4 Drawing Sheets

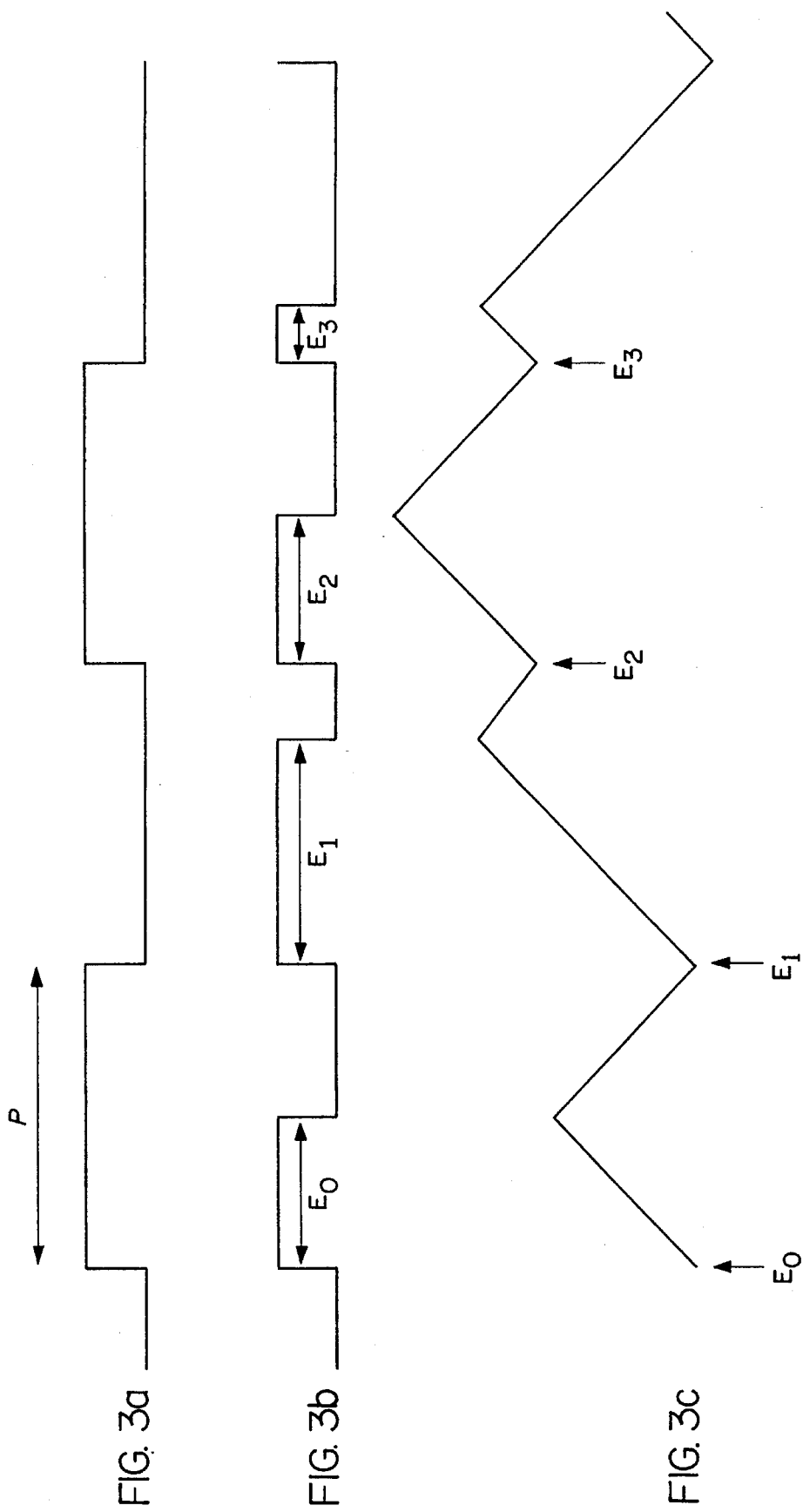

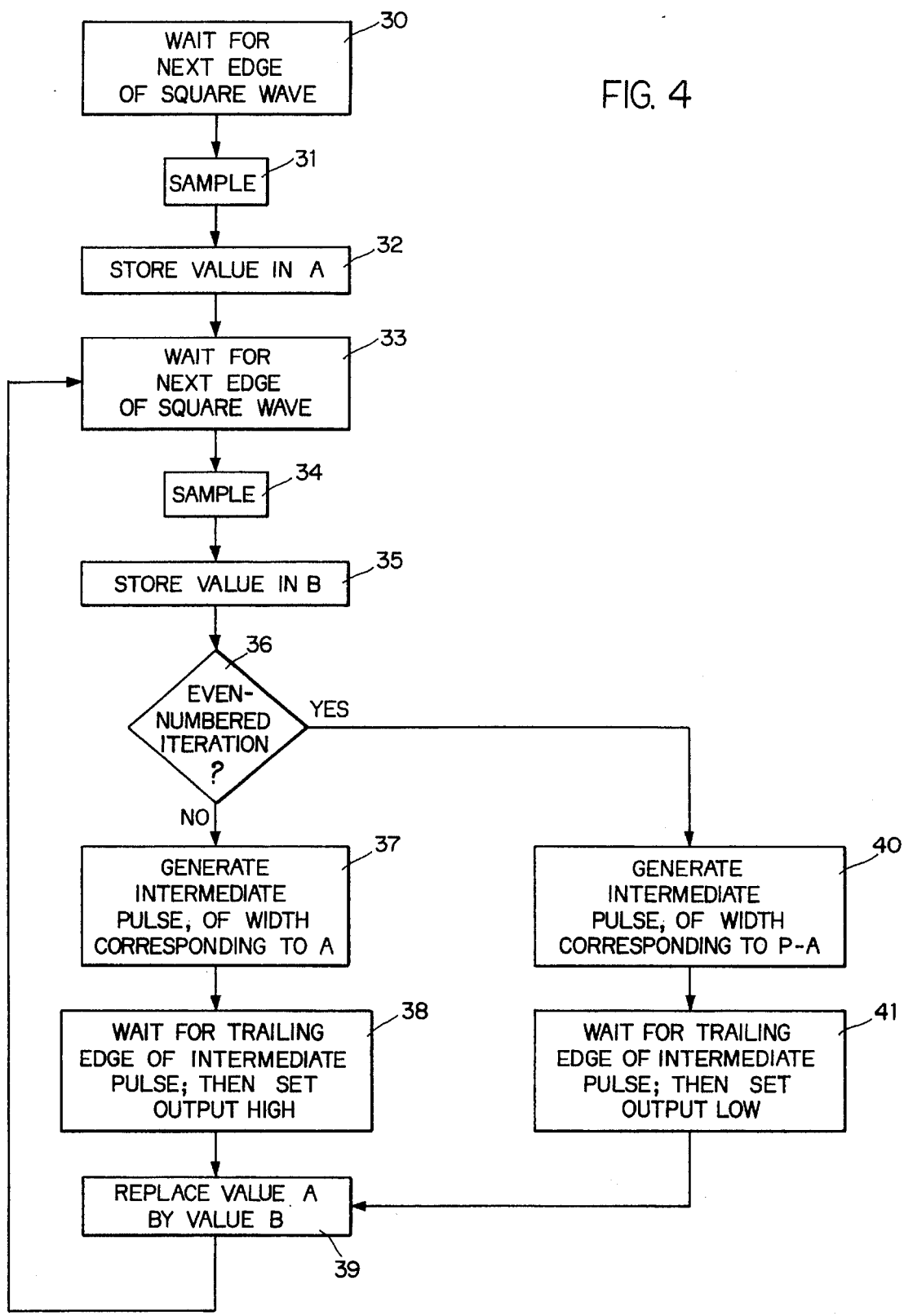

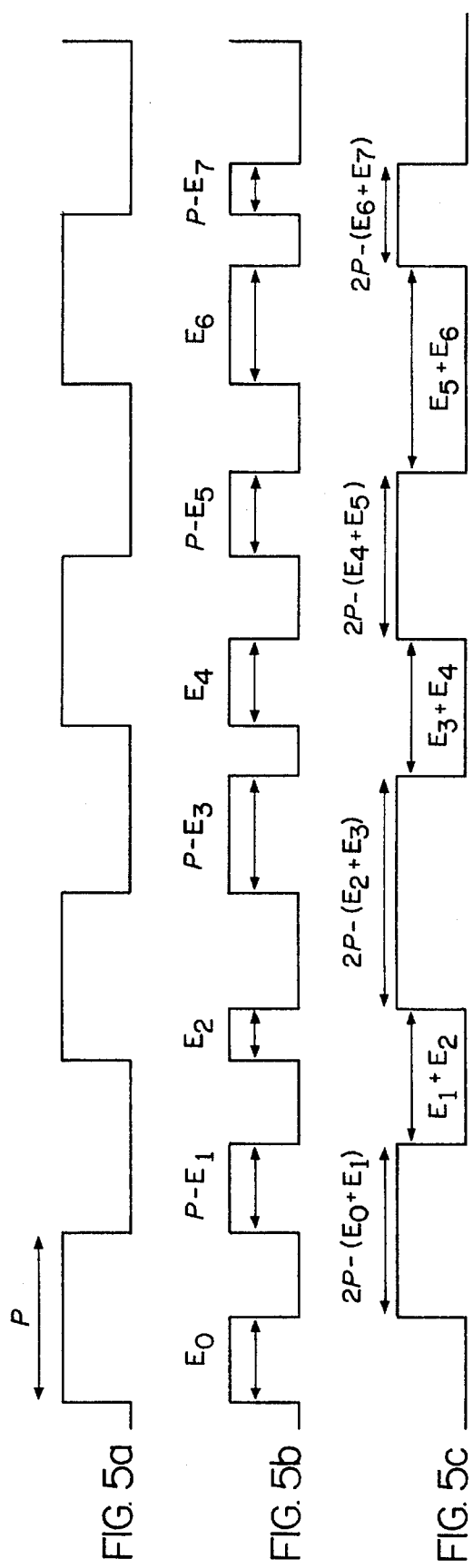

5,497,062

DIGITAL PULSE-WIDTH MODULATED SYSTEM FOR PROVIDING CURRENT TO A LOAD

BACKGROUND OF THE INVENTION

This invention relates to the field of pulse-width modulation (PWM) systems which cause currents to flow through a load in response to an input signal. The invention is particularly useful in the field of motion control, such as in servo-amplifiers, brushless motors, and in other similar applications.

It has been known to control a motor with a servomechanism, wherein the current through the motor is held at a desired value, the desired value being represented by a command signal. The servomechanism regulates the current in the motor by comparing the command signal with a feedback signal, the latter being an appropriately scaled signal representative of the actual motor current. The signal representing the difference between the command signal and the feedback signal is called the "error signal", and this error signal is used to drive an amplifier which applies current to the load.

Linear power amplifiers have been used for increasing the level of the error signal, so as to provide a signal capable of driving the motor. However, linear amplifiers dissipate power, and this power dissipation substantially reduces the efficiency of the system. A system which dissipates power must be provided with heat sinks, cooling fans, and similar apparatus, and the system's size and weight is therefore increased. The energy used to develop the power dissipated in the amplifier is wasted, increasing the overall cost of operation. Furthermore, excessive heat is known to shorten the useful lives of the semiconductor devices used in the amplifier.

Because of the above-described disadvantages of the linear amplifiers used to drive motors, it is clearly preferable to apply current to the load in a manner which itself does not dissipate power. A pulse-width modulated (PWM) circuit approaches this goal. In a pulse-width modulated circuit, the input signal representing the current to be applied to the load is used to generate a train of pulses, the width of each pulse being related to the instantaneous value of the input signal. The pulses are generated by using a comparator to compare the current signal with a dither signal, which is a sawtooth or triangular wave. When the input signal exceeds the dither signal, the output of the comparator is high; at other times, the output of the comparator is low. The comparator output thus comprises the train of pulses representing the input signal.

The pulses are then used to drive an electronic switching device, such as one or more transistors, for intermittently applying a voltage across the load. When transistors are used as switches, they are either fully on (i.e. saturated) or fully off ("cut-off"). Thus, virtually no power is dissipated in the transistors, because when the transistors are saturated, there is almost no voltage drop, and when they are cut-off, there is negligible current flow. Thus, in effect, a PWM system includes an electronic switch, or set of switches, for applying the voltage of the power supply across the load, wherein the switches do not themselves consume appreciable power.

In practice, transistor switches do consume small amounts of power, because they are never totally cut-off or resistance-free. But the efficiency of a PWM circuit can be as high as about 90–95%, compared with only about 40% for linear amplifiers.

Examples of PWM circuits appear in U.S. Pat. Nos. 5,070,292 and 5,081,409. This specification incorporates by reference the disclosures of the latter patents. In the circuits described in the latter patents, and in other PWM circuits of the prior art, a stream of pulses controls electronic switches which open and close different circuit paths for applying current to the load. The widths of the pulses determine when, and in what direction, the circuit applies current to the load. Thus, the pulse widths directly control the effective current in the load.

The present invention provides a PWM circuit and method which is especially suited for use in a digital implementation of a PWM technique. The invention provides a means for sampling a current signal at times which maximize the reliability of the resulting PWM signal.

SUMMARY OF THE INVENTION

In one embodiment of the invention, an error signal is sampled at times corresponding to the leading and trailing edges of a series of reference pulses. Each value obtained from the sampling operation is used to generate an output pulse, the width of the output pulse being proportional to the sampled value. The output pulses are timed such that their leading edges coincide with leading or trailing edges of the reference pulses. Thus, the leading edges of the output pulses occur at times when sampling is being performed. The result of a particular sampling operation determines the width of the next output pulse. The output pulse formed during a given sampling operation corresponds to the value obtained during the previous sampling operation.

The output pulses comprise a pulse-width modulated signal which can be used to drive any PWM switching circuit. Preferably the entire process of pulse generation is performed digitally, based on analog values of a current signal.

In a second embodiment, the sampling also occurs at times coinciding with the leading and trailing edges of a train of reference pulses. However, in this embodiment, the sampling generally occurs at times which do not correspond to the edges of the output pulses.

In this second embodiment, the sampling operation directly generates a series of intermediate pulses. Each intermediate pulse has a leading edge which coincides with an edge of one of the reference pulses. The widths of the intermediate pulses are alternately A and P-A, where A is the previous sampled value, and P is the constant width of the reference pulses.

The output pulses are derived from the intermediate pulses. During an odd-numbered iteration, an output pulse is begun at the trailing edge of the intermediate pulse. During an even-numbered iteration, the output pulse is terminated at the trailing edge of the intermediate pulse. The latter arrangement assures that the output pulses are offset in time relative to the reference pulses. Alternatively, one can generate the output pulses by combining the reference pulses and the intermediate pulses using the exclusive OR function.

The present invention therefore has the primary object of providing a pulse-width modulated (PWM) signal for applying current to a load.

The invention has the further object of providing a PWM signal which is produced by digital means.

The invention has the further object of providing a PWM signal in which the sampling of a current signal is performed at optimal times.

The invention has the further object of increasing the accuracy and efficiency of a PWM circuit.

The reader will recognize other objects and advantages of the present invention, from a reading of the following brief description of the drawings, the detailed description of the invention, and the appended claims.

BRIEF DESCRIPTION OF THE DRAWINGS

FIGS. 3a–3c provide diagrams showing a typical current signal to be sampled, together with the PWM signal produced according to the first embodiment of the invention.

FIG. 4 provides a flow chart showing the basic programming steps for practicing the second embodiment of the invention.

FIGS. 5a–5d provide diagrams showing a typical current signal, and the pulses used in producing the PWM signal according to the second embodiment of the invention.

DETAILED DESCRIPTION OF THE INVENTION

Figure 1:
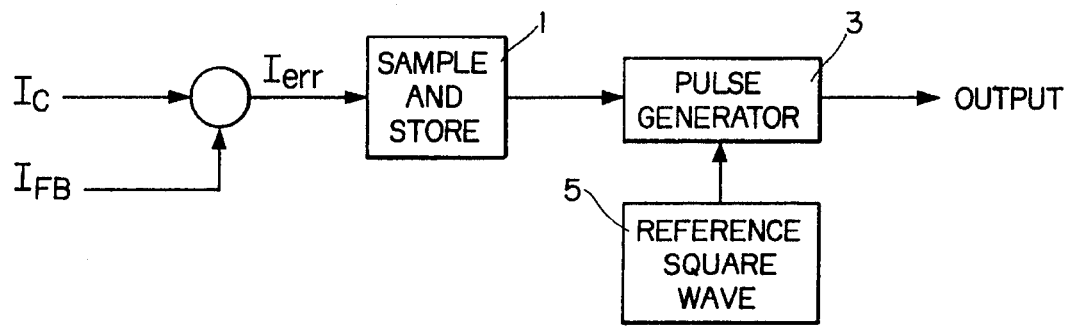
FIG. 1 provides a block diagram of a circuit made according to the present invention.

FIG. 1 shows, in block form, the basic components of the present invention. A current command signal $I_C$ represents a current to be applied to a load. The current $I_{FB}$ represents a feedback signal, indicative of the actual instantaneous measured current. These two current signals are connected to a comparator which produces a signal representative of their difference. This difference signal is denoted as $I_{err}$, indicating an "error" signal. The error signal is sampled periodically in sampling device 1. Device 1 also includes means, such as a computer, for storing sampled values of current. The sampled current values are used to control pulse generator 3, which produces the pulse-width modulated (PWM) signal which will determine the amount of current flowing through the load (not shown). A reference square wave, produced in block 5, comprises an input to the pulse generator.

The circuit of FIG. 1 can be used in either of the two embodiments of the invention to be discussed below.

The term "error signal" is not intended to limit the invention. While the embodiments to be described show the production of PWM signals based on an error signal, it should be understood that the invention can be practiced with virtually any kind of signal. Thus, for example, one could produce a PWM signal using, as an input signal, the actual command current signal $I_C$.

FIGS. 3a–3c show the pulses produced according to the first embodiment of the invention. The vertical axis represents an amplitude and the horizontal axis represents time. FIG. 3a shows a reference square wave which is used to time the sampling and pulse-generating operations. As indicated in FIG. 3a, the reference square wave is formed of pulses having a constant width, the pulses being separated by intervals equal to the width of the pulses, these intervals also being equal to each other. For convenience, the "period" of the square wave, in this embodiment, is defined as the width of one of the pulses, and is designated as P in FIG. 3a.

FIG. 3c represents a hypothetical error signal. The error signal is what determines the voltage to be applied to the load. The error signal could be analog, and could be sampled and then converted to digital form. The error signal could also be first converted to digital form before it is sampled. The error signal constitutes the input signal for the system; this is the signal which is to be converted into a train of pulses.

The sampling is done at every edge of the reference square wave, as shown. That is, sampling occurs at the leading edge of a pulse of the square wave, then at a trailing edge, then at the leading edge of the next pulse, and so on. The sampling therefore occurs at those points designated by the arrows in FIG. 3c. FIG. 3b shows the pulses generated according to the sampled signal. Each pulse in FIG. 3b has a leading edge which coincides with an edge of the pulses of the reference square wave. The width of each pulse of FIG. 3b is equal to (or proportional to) the sampled value of the error signal. Thus, if the sampled values are designated $E_0$, $E_1$, $E_2$, etc., then the widths of the pulses in FIG. 3b are equal to (or proportional to) $E_0$, $E_1$, $E_2$, etc.

Note that a sampled value is used to determine the width of the next pulse, not the present pulse. That is, at the same time that the error signal is sampled, the sampling and storage device outputs the previously stored sampled value. Thus, for example, when the device is sampling the value of $E_2$, it is simultaneously transmitting the value of $E_1$, previously stored from the prior sampling operation, for use in determining the width of the output pulse. In FIG. 3c, the notation $E_0$, together with the arrow, indicates that sampling is occurring at that moment and the circuit is transmitting the previously stored value $E_0$ for use in generating the present pulse. It is possible to provide other means of accommodating the inevitable time lag between measurement of a signal and production of a pulse; the present invention is not limited to a particular method.

The pulses of FIG. 3b comprise the output of the circuit. These pulses are used to determine the current through the load. The pulses can be connected to the load in any of the ways described in the above-cited patents, or in any other equivalent manner.

Figure 2:
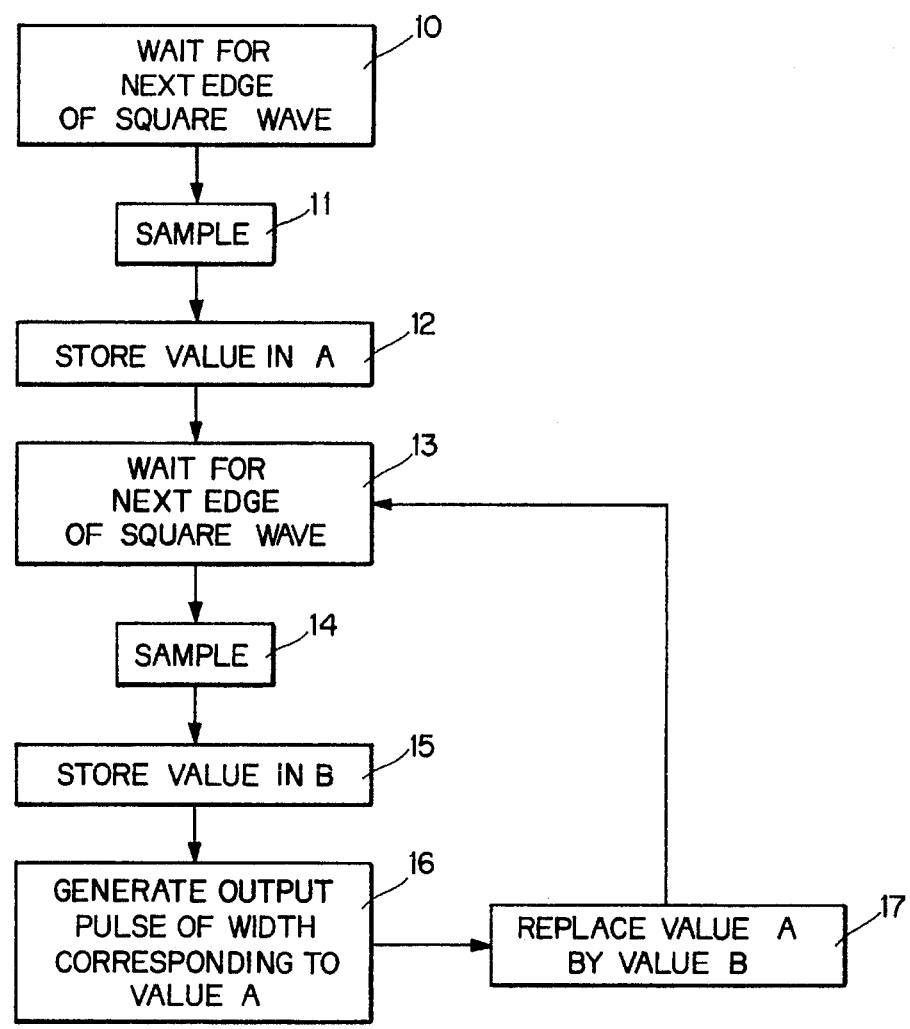
FIG. 2 provides a flow chart showing the basic programming steps for practicing the first embodiment of the invention.

The arrangement represented in FIGS. 3a–3b is especially adaptable to a digital implementation. FIG. 2 shows a flow chart which illustrates the basic programming steps. In block 10, the program monitors the reference square wave, and "waits" until it detects the next edge of the square wave. That is, the program waits for the next leading or trailing edge. At the moment the edge is detected, the program samples the value of the error signal, in block 11, and stores this sampled value in a memory location designated as A, as shown in block 12. Although the sampling and storing operations are shown as sequential, the operations are performed a short time after detection of an edge of the square wave, and this short time is much smaller than the width P of the square wave pulse. Thus, for practical purposes, one can assume that the detection of an edge and the sampling and storing operations occur substantially simultaneously.

The program then waits for the next edge of the square wave, in block 13, samples the error signal in block 14, and stores the sampled value in memory location B, as indicated in block 15. Then, the program generates a pulse having a width corresponding to the value stored in A, as shown in block 16. Block 16 therefore produces the pulses shown in FIG. 3b. The operation in block 16 can be implemented digitally by using a counter which counts up until the value stored in A is reached. While the counter is counting, the output signal is held high; when the counter reaches the value stored in A, the output signal is made low. The same counter could also be used to generate the reference square wave.

In block 17, the program replaces the value stored in A by the value stored in B. Thus, the value stored in B becomes the next value which determines the length of the output pulse. The program returns to block 13. The next sampled value will be stored in B, overwriting the previous stored value, and the program continues as described above. Thus, at each sampling step, the program samples the error signal and outputs the error signal sampled in the previous sampling operation. This procedure gives the system time, in the case of analog sampling, to perform an analog-to-digital conversion between the time of the actual sampling and the time at which the next pulse is to be generated. Also, it gives the system the chance to "plan" the width of the next output pulse.

A typical value of P, the width of the square wave pulses, is about 25 microseconds. This interval is short enough to provide an adequate PWM signal, but long enough to allow the system time to do various tasks between sampling operations. As noted above, a portion of this time is used in analog-to-digital conversion (if the signal being sampled is in analog form). Other digital signal processing can be performed during the remainder of the time interval, before the next sampling operation occurs. Thus, in FIG. 3c, the basic working interval is the time between successive sampling operations, i.e. between adjacent arrows. The first portion of that interval can be devoted to the A/D conversion, and the remainder of the interval can be devoted to digital signal processing (DSP). In general, these first and second portions of the basic interval can be approximately equal. They may also be of different lengths.

While the embodiment represented by FIGS. 2 and 3 produces a PWM signal, it has the following disadvantages. Since the output PWM signal (FIG. 3b) is used to drive switches which connect a source of electric current to the load, it is apparent that all sampling in this embodiment is done at the same time the switches are being opened or closed. The switches will be reconfigured at the leading and trailing edges of the PWM pulses shown in FIG. 3b. Note, in FIG. 3c, that a sampling operation occurs at every leading edge of an output PWM pulse. It turns out that the worst time to sample the current is when the switching occurs. At the moment the switching occurs, the electrical "noise" in the circuit is greatest, so the sampled value may not accurately reflect the true value of the error signal. Moreover, sampling at times coincident with the leading edges of the PWM pulses means that the sampling generally occurs in a "valley" of the error signal. For better accuracy, one wants to sample the error signal at a point which is closer to its average value, not near a valley.

The second embodiment of the invention overcomes the disadvantages of the first embodiment, discussed above. FIG. 4 provides a flow chart representing the basic programming steps of the second embodiment, and FIGS. 5a–5d provide waveforms illustrating this embodiment. In the second embodiment, there is still a reference square wave, shown in FIG. 5a, each pulse of which has a width P. As before, all the pulses of the square wave have equal width, and the intervals between pulses also have width P. As in the first embodiment, the sampling always occurs at the edges (leading or trailing) of the reference square wave. Also as before, when the sampling is done, the system generates a value corresponding to the previous sampled value, for use in generating the output pulses. FIG. 5d represents the sampled error signal, and the vertical arrows identify the moments at which sampling occurs. Thus, the vertical arrow near the symbol $E_0$ means that sampling occurs and the system transmits value $E_0$ which was stored during the previous sampling operation. The same components are used as in the first embodiment; the difference lies in the programming of these components.

The second embodiment differs from the first embodiment in that the second embodiment generates a series of intermediate pulses, and uses these pulses to generate the final output signal. FIG. 5b shows these intermediate pulses. Each pulse begins at an edge of the reference square wave. The width of the first intermediate pulse corresponds to the value of the sampled error signal that was previously stored. The width of the next intermediate pulse corresponds to P minus the value of the sampled error signal that was previously stored. Thus, in FIG. 5d, the vertical arrow together with the symbol $P-E_1$ means that sampling occurs and the system transmits the value $P-E_1$, where $E_1$ is the sampled value stored in the previous sampling operation. The width of the next intermediate pulse corresponds to the value of the previously sampled signal, and so on.

One can describe the formation of the intermediate pulses in the following alternative way. Suppose that the sequence of stored sampled values of the error signal is $E_0$, $E_1$, $E_2$, $E_3$, etc. Then the widths of the intermediate pulses will be, respectively, $E_0$, $P-E_1$, $E_2$, $P-E_3$, etc. This sequence is shown explicitly in FIG. 5b, which indicates the width of each intermediate pulse.

The final PWM output signal, shown in FIG. 5c, is assembled in the following way. The output signal becomes high at the trailing edge of the first intermediate pulse. The output signal becomes low at the trailing edge of the next intermediate pulse. The output signal again becomes high at the trailing edge of the next intermediate pulse, and so on. From the definition of the intermediate pulses and the fact that they are timed to coincide with the edges of the reference square wave, one can prove that the widths of the output pulses are $2P-(E_0+E_1)$, $2P-(E_2+E_3)$, $2P-(E_4+E_5)$, etc., and that the intervals between output pulses are $E_1+E_2$, $E_3+E_4$, $E_5+E_6$, etc. The output pulses, shown in FIG. 5c, can then be used to control the current in the load in the conventional manner.

As a consequence of the procedure described above, the output PWM pulses have leading edges which do not normally coincide with the sampling operations. In general, the sampling occurs while the output signal is either low or high. Thus, in this second embodiment, sampling does not normally occur when the PWM circuit is being switched. Moreover, sampling tends to occur at times when the error signal is reasonably close to its average value. Thus, inaccuracies due to electrical noise, and due to sampling at inappropriate times, are minimized in this embodiment.

As in the first embodiment, each time interval between sampling operations can be devoted first to analog-to-digital conversion, followed by digital signal processing (DSP), as required. As before, the A/D conversion and DSP may occupy roughly equal portions of the basic working interval. Other divisions of the working interval can also be used.

FIG. 4 shows the basic programming steps used in implementing the second embodiment, described above. In block 30, the system waits for the next edge of the reference square wave, and in blocks 31 and 32, the system samples the error signal and stores the sampled value in location A. As in the first embodiment, these operations can be considered to occur almost simultaneously. In block 33, the system waits for the next edge of the square wave, and in blocks 34 and 35, the system samples the error signal and stores the sampled value in location B. So far, the process is the same as in the first embodiment.

In test 36, the system determines whether this iteration is even-numbered or odd-numbered. If it is odd-numbered, the program proceeds with block 37, where the system generates an intermediate pulse having a width corresponding to the value stored in A. Then, in block 38, the system waits for the trailing edge of the intermediate pulse just produced, and sets the output high when this trailing edge is detected. In block 39, the system replaces the value of A with the value of B, and returns to block 33. If the iteration is even-numbered, the system proceeds to block 40, wherein the system generates an intermediate pulse having a width corresponding to P-A. In block 41, the system waits for the trailing edge of the intermediate pulse just produced, and sets the output low when this trailing edge is detected. The program continues with block 39. It is apparent that the procedure described in FIG. 4 produces the pulses shown in FIG. 5c.

It is possible to produce the results represented in FIG. 5 by different logic. For example, instead of keeping track of whether the iteration is even or odd, one could determine whether the edge of the square wave of FIG. 5a is rising or falling. If it is a rising edge, one would generate an intermediate pulse of width $E_i$, and if it is a falling edge, one would generate an intermediate pulse of width $P-E_i$, where i is an integer indicating the number of the iteration. The latter procedure is entirely equivalent to that depicted in FIGS. 4 and 5. Thus, these figures should not be deemed to limit the invention.

Note also that the output pulses of FIG. 5c can be derived by applying the "exclusive OR" function to the pulses of FIGS. 5a and 5b. One can write FIG. 5c=FIG. 5a$\oplus$FIG. 5b, where $\oplus$ is the exclusive OR function. The exclusive OR function is defined such that A$\oplus$B is one if one of either A or B is one, and zero if A and B are both zero or both one. The use of the exclusive OR function yields exactly the same result obtained through the logic of FIG. 4.

In summary, in the first embodiment, one begins each output pulse at a fixed time, i.e. at a time coinciding with an edge of the reference square wave, and positions the trailing edge according to a sampled value. In the second embodiment, one varies the time of both the leading and the trailing edges of the output pulses. Thus, in the second embodiment, one uses two calculations to make one pulse, because one needs to calculate the location of both edges. The latter procedure effectively reduces the PWM frequency by one-half, though the processing frequency is unchanged. Thus, the switching bandwidth is unchanged, but one incurs fewer switching losses.

One can modify the invention in many ways. As noted above, while the preferred embodiment is implemented digitally, all or part of the steps of the present invention can be implemented in an analog manner. Various equivalent means of generating pulses can be used. These and other similar modifications, which will be apparent to those skilled in the art, should be considered within the spirit and scope of the following claims.

What is claimed is:

1. A method of producing a pulse-width modulated signal for providing current through a load according to an input signal, the method comprising the steps of:

a) providing a reference square wave, the square wave having a plurality of pulses of equal width, each pulse having a leading edge and a trailing edge, wherein the pulses are spaced apart by a time interval equal to the width of the pulses, the width of the pulses being called P, b) repeatedly sampling the input signal at times corresponding to edges of the pulses of the reference square wave, to produce a series of values, the values being called $E_0, E_1, E_2, \ldots E_n$, where n is a positive integer, and generating a series of intermediate pulses, each intermediate pulse having a width, wherein the width of every other intermediate pulse corresponds to $E_0, E_2, E_4 \ldots$, and wherein the widths of the remaining intermediate pulses correspond to $P-E_1, P-E_3, P-E_5, \ldots$, each of the intermediate pulses having a leading edge corresponding to successive edges of the reference square wave, c) generating a series of output pulses, the output pulses having widths, wherein the widths of the output pulses correspond to $2P-(E_0+E_1), 2P-(E_2+E_3), 2P-(E_4+E_5), \ldots$, and wherein there are intervals between the output pulses, the intervals having widths corresponding to $E_1+E_2, E_3+E_4, E_5+E_6, \ldots$, and d) using the output pulses to provide current through the load.

2. The method of claim 1, wherein the output pulses are generated by combining the reference square wave with the intermediate pulses according to an exclusive OR function.

3. The method of claim 1, wherein the sampling occurs alternately at leading and trailing edges of the reference square wave, wherein the sampling occurs sequentially at each edge of the reference square wave.

4. The method of claim 1, wherein the value derived from a given sampling step is used to determine the width of arm intermediate pulse which has a leading edge coinciding with the next sampling step.

5. The method of claim 1, wherein the width of each intermediate pulse is determined by a timer which provides a pulse having a width corresponding to the sampled value or to P minus the sampled value.

6. A method of producing a pulse-width modulated signal for providing current through a load according to an input signal, the method comprising the steps of:

a) repeatedly sampling the input signal at a predetermined sequence of times, each sampling step resulting in a numerical value, b) generating a series of pulses, each pulse having a width determined according to two of said sampled values, wherein the pulses generated in step (b) have leading and trailing edges at times which do not coincide with times at which the sampling steps occur.

7. Apparatus for producing a pulse-width modulated signal for providing current through a load, the apparatus comprising:

a) means for providing an input signal representative of the current to be applied to the load, b) means for repeatedly sampling the input signal at a predetermined sequence of times, the sampling means also including means for storing numerical values obtained from such sampling, and c) means for generating pulses according to said sampled values, each pulse having a width determined according to two of said sampled values, wherein the pulses generated by the pulse generating means have leading and trailing edges at times which do not coincide with times at which the sampling occurs, and wherein pulses produced by the generating means comprise the pulse-width modulated signal for providing current through the load.

* * * * *